(12) United States Patent
Gerdes et al.

(10) Patent No.: US 6,952,964 B2
(45) Date of Patent: Oct. 11, 2005

(54) VEHICLE WHEEL BALANCER SYSTEM

(75) Inventors: Michael D. Gerdes, St. Peters, MO (US); Michael W. Douglas, St. Peters, MO (US); David M. Scribner, St. Charles, MO (US); Joel Clasquin, Edwardsville, IL (US); William B. Feero, St. Louis, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 10/648,165

(22) Filed: Aug. 26, 2003

(65) Prior Publication Data

US 2004/0244483 A1 Dec. 9, 2004

Related U.S. Application Data

(63) Continuation-in-part of application No. 10/455,623, filed on Jun. 5, 2003, now abandoned.

(51) Int. Cl.[7] .............................. G01M 1/16; G01M 1/00
(52) U.S. Cl. .......................................... 73/462; 73/459
(58) Field of Search .................. 73/457, 459, 460–462

(56) References Cited

U.S. PATENT DOCUMENTS

| 4,854,168 A | 8/1989 | Himmler | 73/459 |
| 4,891,981 A | 1/1990 | Schonfeld | 73/460 |
| 5,396,436 A | 3/1995 | Parker et al. | 700/279 |
| 5,915,274 A | 6/1999 | Douglas | 73/462 |
| 6,481,282 B2 | 11/2002 | Douglas et al. | 73/461 |

*Primary Examiner*—Hezron Williams
*Assistant Examiner*—Tamiko Bellamy
(74) *Attorney, Agent, or Firm*—Polster, Lieder, Woodruff & Lucchesi

(57) ABSTRACT

A method for providing a centering check for a rotating body mounted on a wheel balancer based on measuring at least one imbalance parameter and for determining weight display thresholds for static and dynamic imbalance correction weights which vary with parameters of the wheel and/or tire. The rotating body is mounted on a spindle of the wheel balancer and an imbalance parameter or runout measurement taken. The mounting of the rotating body on the spindle is then altered, and a second measurement of the imbalance parameter or runout is taken. A processor in the wheel balancer determines if the difference between the first and second measurements exceeds a predetermined threshold value, indicative of off-center mounting of the rotating body one the spindle. Upon centered mounting of the rotating body, imbalance measurements are acquired, and required correction weights are displayed to an operator if they exceed an identified imbalance threshold level.

13 Claims, 11 Drawing Sheets

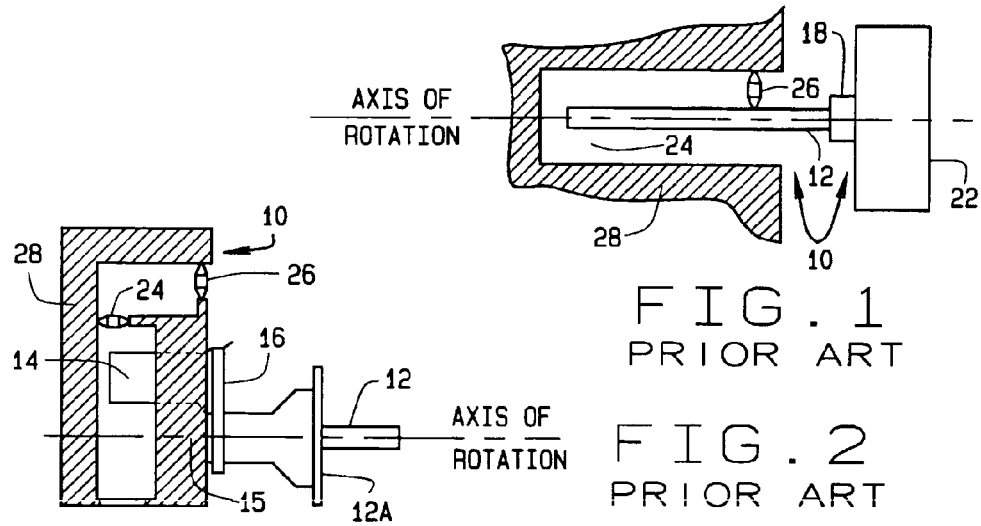
FIG. 1
PRIOR ART
FIG. 2
PRIOR ART
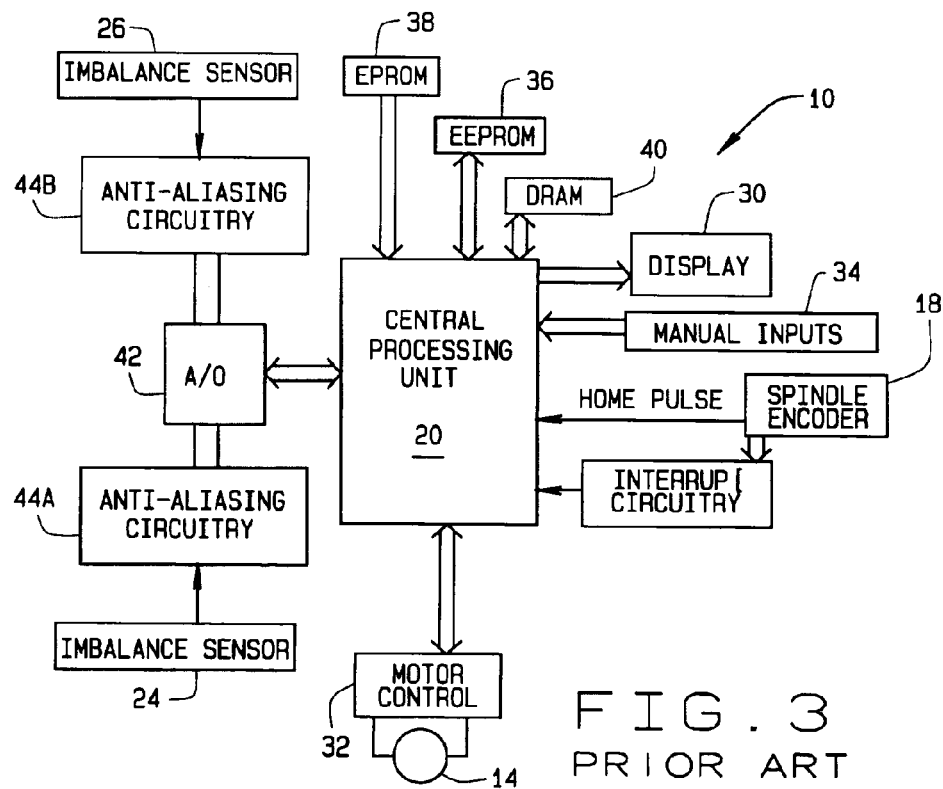
FIG. 3
PRIOR ART

VEHICLE WHEEL BALANCER SYSTEM

CROSS-REFERENCE TO RELATED APPLICATIONS

The present application is a continuation in part of, and claims priority from, co-pending U.S. patent application Ser. No. 10/455,623 filed on Jun. 5, 2003, now abandoned.

STATEMENT REGARDING FEDERALLY SPONSORED RESEARCH

Not Applicable.

BACKGROUND OF THE INVENTION

The present invention relates generally to automotive service equipment designed to measure imbalance in a vehicle wheel assembly, and in particular, to an improved wheel balancer system configured to adjust an imbalance correction threshold level and to check centering of wheels mounted to the wheel balancer system.

Wheel balancer systems are designed to determine characteristics of a rotating body such as a wheel assembly consisting of a wheel rim and a pneumatic tire, or of a wheel rim alone. The determined characteristics include, but are not limited to static imbalances, dynamic imbalances, lateral forces, radial forces and runout parameters. Determination of some of these characteristics result from direct measurements, while others are obtained from an analysis of the mechanical vibrations caused by rotational movement of the rotating body. The mechanical vibrations are measured as motions, forces, or pressures by means of transducers mounted in the wheel balancer system, which are configured to convert the mechanical vibrations into electrical signals.

Existing wheel balancer systems suffer from subtle deficiencies in connection with providing compensation for run-out and in tire to rim matching procedures. These systems, such as the GSP9700 Series manufactured by Hunter Engineering Co. of Bridgeton, Mo. are capable of displaying an angular location at which a pneumatic tire should be mounted to a wheel rim to minimize an overall radial force variation associated with the wheel assembly. For an accurate measurement of rim runout at the beadseat of the tire, it is necessary for the rim runout to be measured without the tire mounted thereon, and then for the rim to be dismounted from the balancer, and the tire mounted to the rim. The wheel assembly consisting of the tire and rim is then remounted to the balancer to measure the force variations associated therewith. Any centering difference with respect to the initial and subsequent mounting of the rim and wheel assembly on the balancer spindle will result in errors in the determination of the rim runout, the assembly force variation, and the tire force variation computations. This "centering error" can become even more significant with larger wheel assembles, such as those currently entering the market.

There are many types of adaptors for use when mounting and centering wheels onto a balancer spindle. Common examples of adaptors are cones, centering sleeves, flange plates with rigid pins, flange plates with compliant pins, clamp cups and other devices as can be seen in publications such as Hunter Engineering Company accessory brochure, Form No. 3203T, entitled "Wheel Balancer Accessories". Often there are several different adaptors that may be used to mount a wheel on a wheel balancer. Due to variations in wheel design there are usually several adaptors, or combinations of adaptors, that appear to fit the wheel, but actually do not center the wheel adequately on the wheel balancer shaft. Accordingly, it is desired to develop a solution to aid the operator in selecting the best adaptor for a wheel.

One solution to the centering error problem induced by the dismounting and remount of a wheel rim or wheel assembly on a balancer system spindle is addressed in U.S. Pat. No. 6,481,282 B2 for "Wheel Balancer System With Centering Check". The solution set forth in the '282 patent requires that the wheel rim runout be measured before and after the wheel rim is dismounted from the balancer system, and a comparison carried out. If the comparison of the two runout measurements indicates a difference which is greater than a predetermined threshold, it is assumed that the wheel rim has not been properly centered on the balancer spindle during the remounting procedure, and a warning is provided to the operator. The solution presented in the '282 patent further requires that the wheel balancer system include the capacity to measure and store wheel rim runout parameters (i.e. magnitude and phase) for subsequent comparisons with predetermined threshold values.

As not all wheel balancer systems are capable of measuring wheel rim runout, it would be a particular advantage for a wheel balancer system to incorporate a centering check process which does not require a measurement of wheel rim runout both before and after altering the balancer mounting of the of a wheel rim or wheel assembly.

While accurate centering of a wheel rim or wheel assembly on a balancer is important to obtain accurate measurements of any imbalance present therein, it is additionally important to provide an operator with information about whether or not there is a need to correct a detected imbalance in the wheel rim or wheel assembly, or if the detected imbalance is sufficiently small so as to have a negligible effect on vehicle performance and handling. Currently, wheel rim sizes in the U.S. market range from 13.0 inches in diameter up to and including the present DOT limit of 24.0 inches in diameter. It is anticipated that wheel rim sizes will increase to 26.0 inches in diameter in the near future, with a corresponding increase in associated tire sizes. A problem presented by the continued increase in wheel rim and wheel assembly sizes is the effect of a fixed imbalance correction threshold level.

Due to the limited size increments in which imbalance correction weights are available, conventional balancer systems are configured to display as zero any required imbalance correction weight values below a predetermined threshold. Typically the predetermined threshold is 0.29 oz., and is selected to be slightly greater than the smallest imbalance correction weight increment, regardless of the size of the wheel rim or wheel assembly. This can result in an operator "chasing" weights on a small or narrow wheel due to the significant effect of the threshold level on imbalances, and a poor balance on larger diameter wheels due to a reduced effectiveness of the threshold level. One solution is shown in U.S. Pat. No. 6,484,574 to Douglas, in which a balancer is configured to select the best weight plane locations from data acquired by scanning the rim profile. This is an advantageous method, but it is not economical for all balancers to have this feature.

Clearly, it would be further advantageous to provide a wheel balancer system with a method for determining an imbalance correction threshold level which varies in relation to the dimensions of the wheel assembly undergoing balancing in addition to the incremental size of the imbalance correction weight employed, and which provides an operator with a scaled visual indication of any remaining imbalances present after application of suggested imbalance correction weights at suggested weight placement locations.

BRIEF SUMMARY OF THE INVENTION

Briefly stated, in a first aspect of the present invention a method of balancing a rotating body includes the steps of mounting the body on a spindle of a balancer, measuring at least one imbalance parameter of the body, altering the mounting of the body on the spindle of the balancer, obtaining a second measurement of the at least one imbalance parameter of the body, calculating a difference between said first measurement and said second measurement for said at least one imbalance parameter, and comparing the calculated difference with a predetermined threshold amount to determine whether the rotating body is properly centered on the balancer spindle.

In a second aspect of the present invention, a method of balancing a rotating body includes the steps of determining an imbalance correction weight placement diameter and an imbalance correction weight placement separation distance, utilizing the determined placement diameter together with a predetermined imbalance force limit to identify a static imbalance threshold, and utilizing the determined separation distance and weight placement diameter together with a predetermined imbalance moment limit to identify a dynamic imbalance threshold.

In a third aspect of the present invention, a method of balancing a rotating body includes the steps of determining one or more imbalance characteristics of the rotating body, identifying one or more imbalance correction weight amounts and placement locations, and providing a scaled visual display of any imbalance present in the rotating body prior to, or following, application of the one or more imbalance correction weight amounts at the identified placement locations.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1 is a diagrammatic view illustrating a generic wheel balancer suitable for use with the present invention;

FIG. 2 is a simplified top plan view illustrating an alternate generic wheel balancer suitable for use with the present invention;

FIG. 3 is a block diagram illustrating various parts of a generic wheel balancer of FIG. 1 or FIG. 2;

Corresponding reference numerals indicate corresponding parts throughout the several figures of the drawings.

DESCRIPTION OF THE PREFERRED EMBODIMENT

Figure 4:
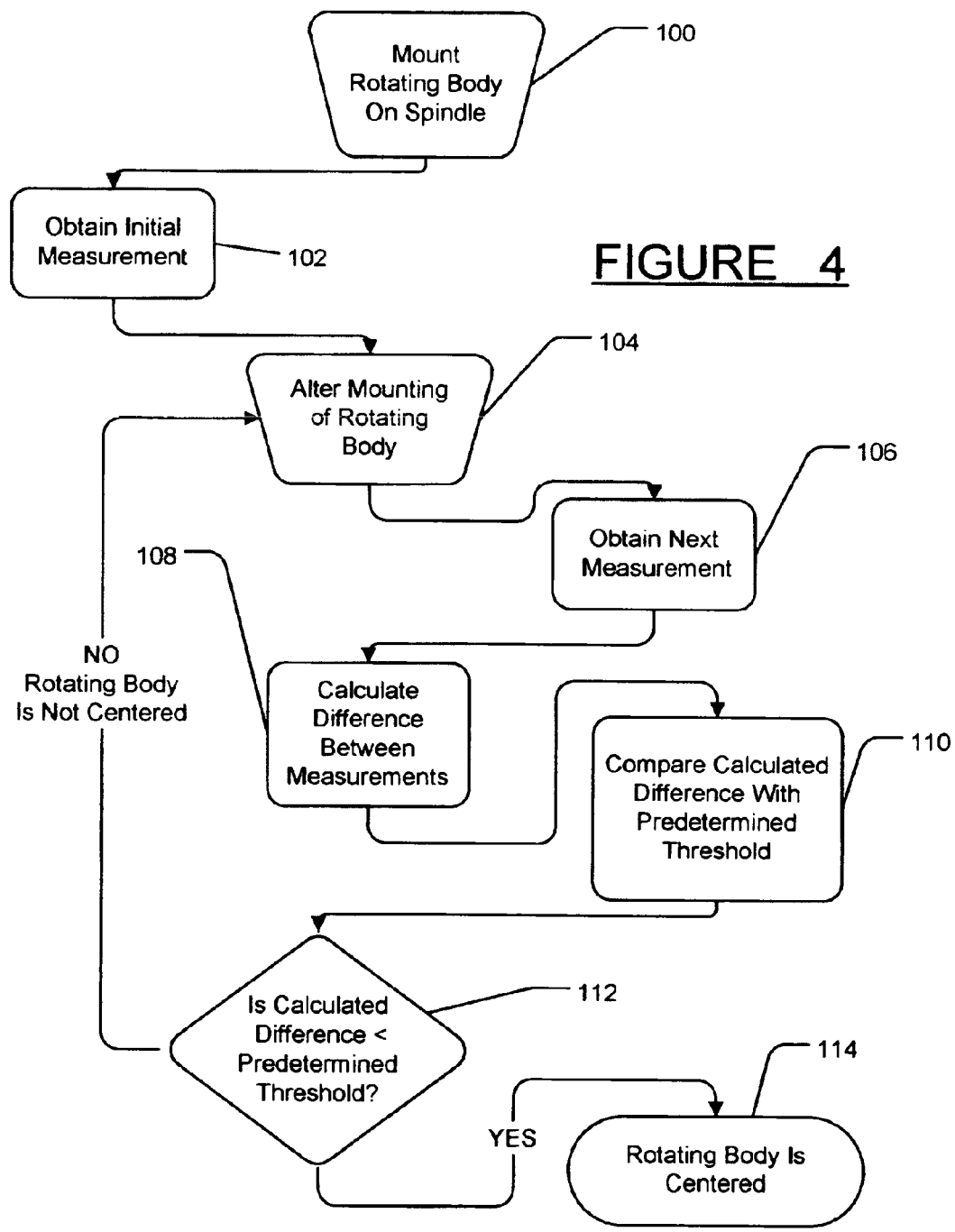
FIG. 4 is a flow chart diagram of a method of the present invention for centering a rotating body on a balancer spindle.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Turning to the drawings, FIG. 1 illustrates, in simplified form, the mechanical aspects of a wheel balancer 10 suitable for the present invention. The particular balancer shown is illustrative only, since the particular devices and structures used to obtain dimensional and imbalance information related to a rotating body could be readily changed without changing the present invention.

Balancer 10 includes a rotatable shaft or spindle 12 driven by a suitable drive mechanism such as a motor 14 and drive belt 16. Mounted on spindle 12 is a conventional optical shaft encoder 18 which provides speed and rotational position information to the central processing unit 20, shown in FIG. 3.

During the operation of wheel balancing, at the end of the spindle 12, a rotating body 22 under test is removably mounted for rotation with the spindle hub 12A. The rotating body 22 may comprise a wheel rim, or a wheel assembly consisting of a wheel rim and a tire mounted thereon. To determine the rotating body imbalance, the balancer includes at least a pair of imbalance force sensors 24 and 26, such as piezoelectric sensors or strain gauges, coupled to the spindle 12 and mounted on the balancer base 28.

Turning to FIG. 2, it can be seen that the actual construction of the mechanical aspects of the balancer 10 can take a variety of forms. For example, the spindle 12 can include a hub 12A against which the rotating body 22 abuts during the balancing procedure.

When a rotating body 22 is unbalanced, it vibrates in a periodic manner as it is rotated, and these vibrations are transmitted to the spindle 12. The imbalance sensors 22 and 24 are responsive to these vibrations in the spindle 12, and generate a pair of analog electrical signals corresponding to the phase and magnitude of the vibrations at the particular sensor locations. These analog signals are input to the circuitry of FIG. 3, described below, which determines the required magnitudes and positions of correction weights necessary to correct the imbalance.

Turning to FIG. 3, wheel balancer 10 includes not only the imbalance sensors 22 and 24, and spindle encoder 18, but also the central processing unit 20 (such as a microprocessor, digital signal processor, or graphics signal processor). The central processing unit 23 performs signal processing on the output signals from the imbalance sensors 22 and 24 to determine an imbalance in the rotating body. In addition, the central processing unit 20 is connected to and controls a display 30 which provides information to an operator, control motor 14 through associated motor control circuits 32, and keeps track of the spindle rotation position with encoder 18.

Balancer 11 further includes one or more manual inputs 34, such as a keyboard, control knobs, or selector switches, which are connected to the central processing unit 20. The central processing unit 20 has sufficient capacity to control, via software, all the operations of the balancer 10 in addition to controlling the display 30. The central processing unit 20 is connected to a memory such as an EEPROM memory 36, EPROM program memory 38, and a dynamic RAM (DRAM) memory 40. The EEPROM memory 36 is used to store non-volatile information, such as calibration data, while the central processing unit 20 uses the DRAM 40 for storing temporary data.

The central processing unit 20 is also connected to an analog-to-digital converter 42. The signals from the imbalance sensors 22 and 24 are supplied through anti-aliasing circuitry 44A and 44B (if needed) to the analog-to-digital converter 42.

The operation of the various components described above is fully set forth in U.S. Pat. No. 5,396,436, the disclosure of which is incorporated herein by reference. It should be understood that the above description is included for completeness only, and that various other circuits could be used instead.

In a first embodiment of the present invention, the balancer 10 is configured with software to provide an operator with an option to perform a centering check to ensure that the rotating body 22 is accurately mounted to the spindle 12. As shown in FIG. 4, after mounting the rotating body 22 on the balancer spindle (Box 100), and an initial measurement of at least one imbalance parameter, such as a raw force transducer output, an imbalance magnitude, an imbalance angular location, or the mass of the rotating body, is obtained (Box 102), the centering check is performed by first loosening a wing nut or other mounting device securing the rotating body 22 to the spindle 12.

With the mounting device loosened, the mounting of the rotating body 22 about the spindle is altered (Box 104), and the wing nut or other mounting device retightened. The altering of the mounting may involve either removing the rotating body 22 from the spindle 12 and replacing it thereon, or simply rotating the rotating body 22 about the axis of the spindle 12.

With the rotating body 22 in the altered mounting position, a second measurement of the previously measured, at least one imbalance parameters is conducted (Box 106). The central processing unit 20 compares the previous measurements with the second measurements taken after the altering of the rotating body mount on the spindle 12 to identify a difference between the two measurements (Box 108). The calculated difference is then compared with a predetermined threshold or tolerance (Box 110). If the results of the comparison indicate the measurements deviate by more than a predetermined amount (Box 112), the central processing unit 20 causes a message to be shown on the display 30 warning of a detected mis-centering of the rotating body 22 on the spindle 12.

To correct a mis-centering of the rotating body 22 on the spindle 12, the central processing unit 20 provides directions to the operator on display 30, requesting that the operator repeat the step of altering the mounting of the rotating body 22 on the spindle 12. Once the rotating body 22 is re-mounted on the spindle 12 in an altered position, the central processing unit obtains an additional measurement of the previously measured imbalance parameters. This process is repeated until the results of a comparison of the most recently obtained measurements and any previously obtained measurements do not deviate by more than a predetermined amount, i.e. indicating that the rotating body 22 is centered to within the predetermined tolerance (Box 114).

The principle reasoning behind the centering check methodology set forth above is that an operator is more likely to properly center the rotating body 22 on the spindle 12 at least twice, and less likely that an operator will mis-center the rotating body 22 twice in the same way, producing nearly identical measurements of the imbalance parameters. Hence, the central processing unit is configured to consider the rotating body 22 to be properly centered upon the spindle 12 the first time the results of the comparison do not indicate a deviation of more than a predetermined amount between the most recent measurement and any previous measurements of the imbalance parameters.

Optionally, the central processing unit 20 may be configured to terminate the centering check procedure, and provide a suitable warning on display 30 to the operator if a predetermined number of mis-centered mountings are detected in sequence. If an operator is unable to properly center the rotating body 22 on the spindle 12 within a predetermined number of tries, it is likely that the centering deviations are not the result of operator mounting error, but rather, are the result of damage to the rotating body 22, spindle 12, or mounting device, or possibly the wrong adaptor is selected to be used to secure the rotating body 22 to the spindle 12.

In an alternate embodiment of the present invention for use when the rotating body 22 is a wheel rim and tire assembly, the runout of the tire mounted on the wheel rim is obtained in place of the measurement of the imbalance parameter. This runout measurement may be made by a device that contacts the outermost diameter of the tire as the tire rotates. For example, an arm with a roller secured thereto, such as is provided with the Hunter GSP9700, or an arm with a fixed surface disposed on the end. Alternatively, the tire outer diameter can be measured by a conventional non-contact tire measurement device, such as an ultrasonic sensor, a laser, or a capacitive proximity sensor. Also alternatively, the lateral runout of the tire sidewall, or any surface on the side of the assembly, can be measured (by a contacting device, or non-contacting device) instead of, or in addition to, radial runout.

After an initial measurement of the tire runout is obtained and stored, the centering check is performed by first loosening a wing nut or other mounting device (not shown) securing the rotating body 22 to the spindle 12. With the mounting device loosened, the mounting of the rotating body 22 about the spindle is altered, and the wing nut or other mounting device (not shown) retightened. The altering of the mounting may involve either removing the rotating body 22 from the spindle 12 and replacing it thereon, or simply rotating the rotating body 22 about the an axis of the spindle 12.

With the rotating body 22 in the altered mounting position, a second measurement of the previously measured tire runout is conducted. The central processing unit 20 compares the previous measurements with the second measurements taken after the altering of the rotating body mount on the spindle 12. If the results of the comparison indicate the measurements deviate by more than a predetermined amount, where the predetermined amount may be a constant or a variable based on wheel/tire size, mass or other parameter, the central processing unit 20 causes a message to be shown on the display 30 warning of a detected mis-centering of the rotating body 22 on the spindle 12, so that suitable corrective action may be taken by the operator.

Once a rotating body 22 is accurately centered on the balancer spindle 12, the balancer 10 can begin the process of measuring one or more imbalance parameters of the rotating body 22, and providing the operator with one or more suggested imbalance correction weight magnitudes and placement locations. Imbalance correction weight magnitudes and placement locations are calculated and displayed to an operator on a screen or numerical readout 30. Due to the limited size increments in which imbalance correction weights are usually available, conventional balancer systems are configured to display to the operator a zero value for any imbalance which would require the installation of an imbalance correction weight amount which is below a predetermined threshold.

Typically the predetermined threshold is selected to be slightly greater than the smallest imbalance correction weight increment, regardless of the size of the wheel rim or wheel assembly. For a system adapted to use imbalance correction weights having 0.25 oz. increments, an exemplary threshold limit is 0.29 oz. of imbalance. This can result in an operator "chasing" weights on a small or narrow wheel due to the insignificant effect of the threshold level on imbalances, and a poor balance on larger diameter wheels.

Figure 5:
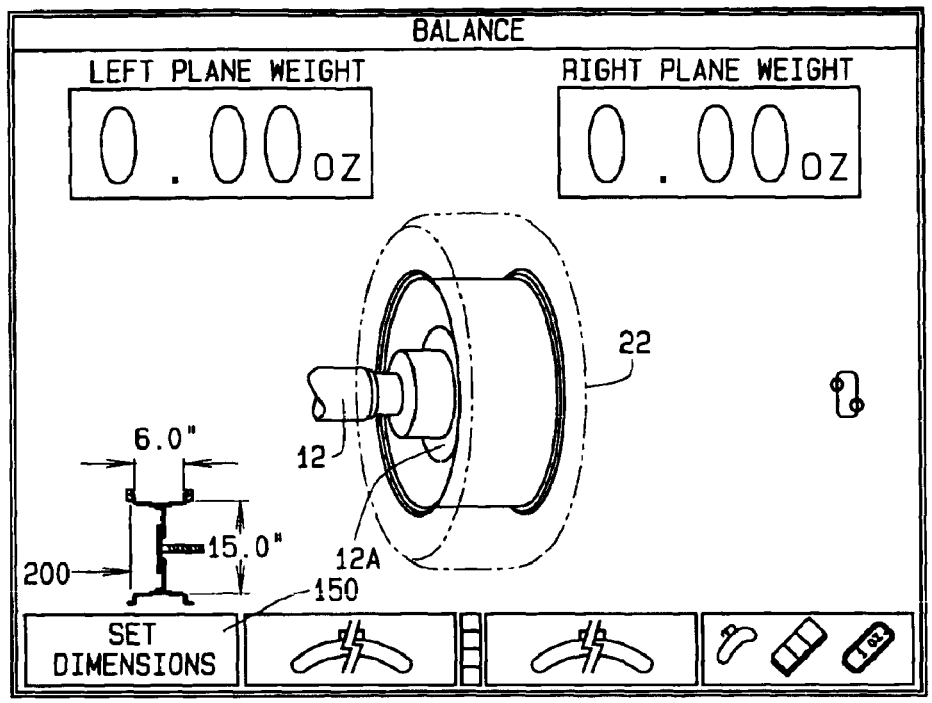
FIG. 5 is a representation of a prior art balancer display indicating no required weight placement for a rotating body of specific dimensions.
Figure 6:
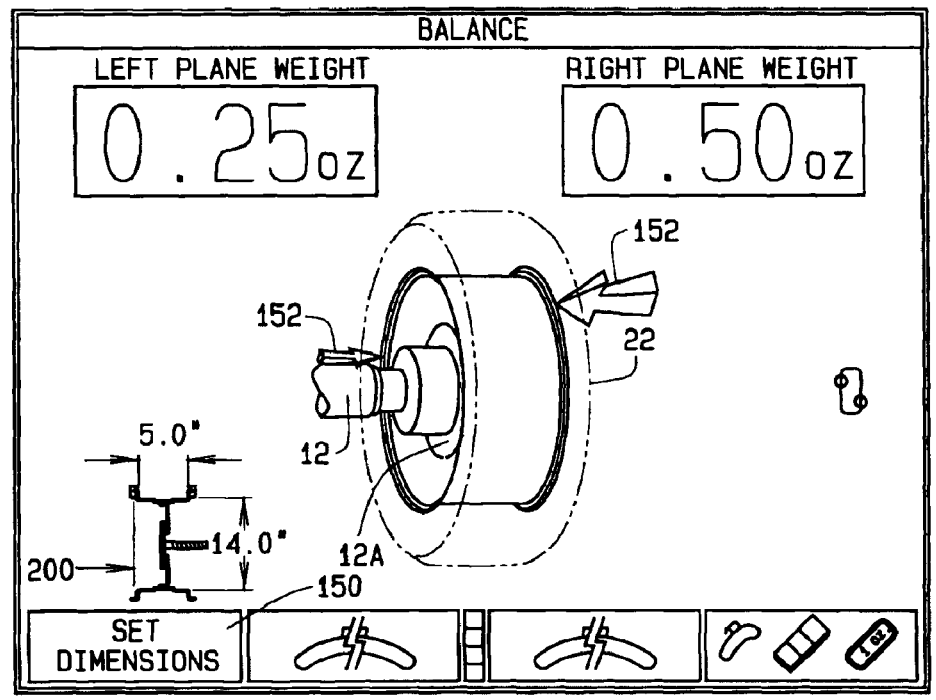
FIG. 6 is a representation of a prior art balancer display similar to FIG. 5, indicating a required weight placement for the rotating body with smaller diameter dimensions but having the same imbalance.

For example, as shown in FIG. 5, a wheel having a 6.0 inch axial width, and a 15.0 inch diameter might require imbalance weights below the predetermined weight threshold, resulting in the balancer displaying to an operator that no imbalance correction weights are required for either the left or right imbalance correction planes. However, as shown in FIG. 6, if the dimensions of the wheel are manually changed by the operator using the "SET DIMENSIONS" button 150 to indicate a 5.0 inch axial width and a 14.0 inch diameter, without re-measuring the wheel imbalance, larger weights are displayed to correct the imbalance, which exceed the predetermined weight threshold level. As a result, a conventional balancer would now direct an operator to install weights in the left and right imbalance correction planes (as indicated by arrows 152) despite the fact that the amount of the imbalance is unchanged.

Figure 7:
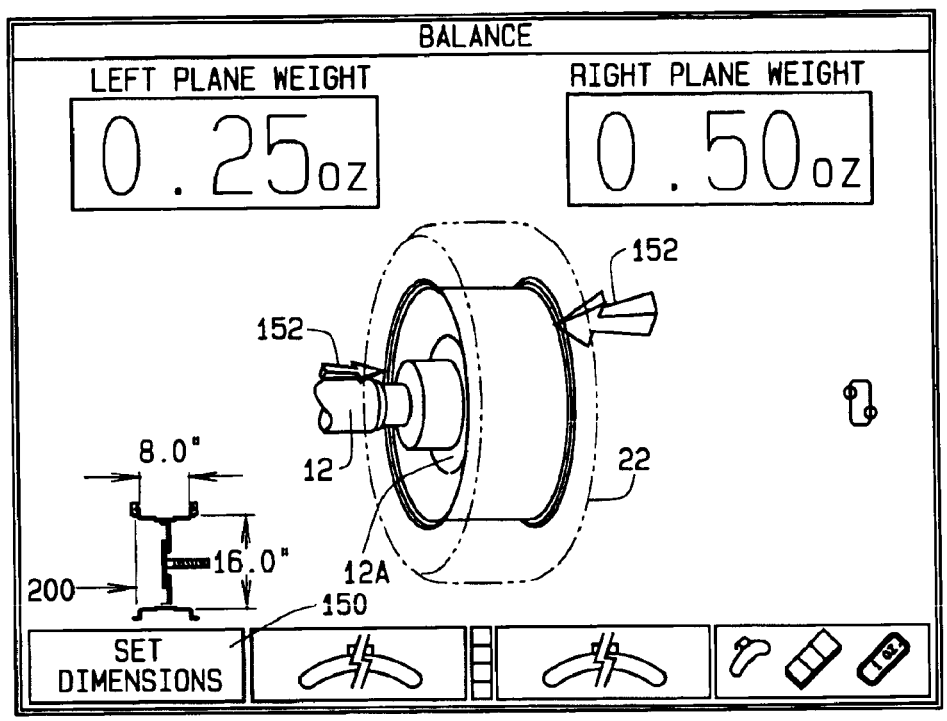
FIG. 7 is a representation of a prior art balancer display indicating required weight placement for a rotating body of specific dimensions.
Figure 8:
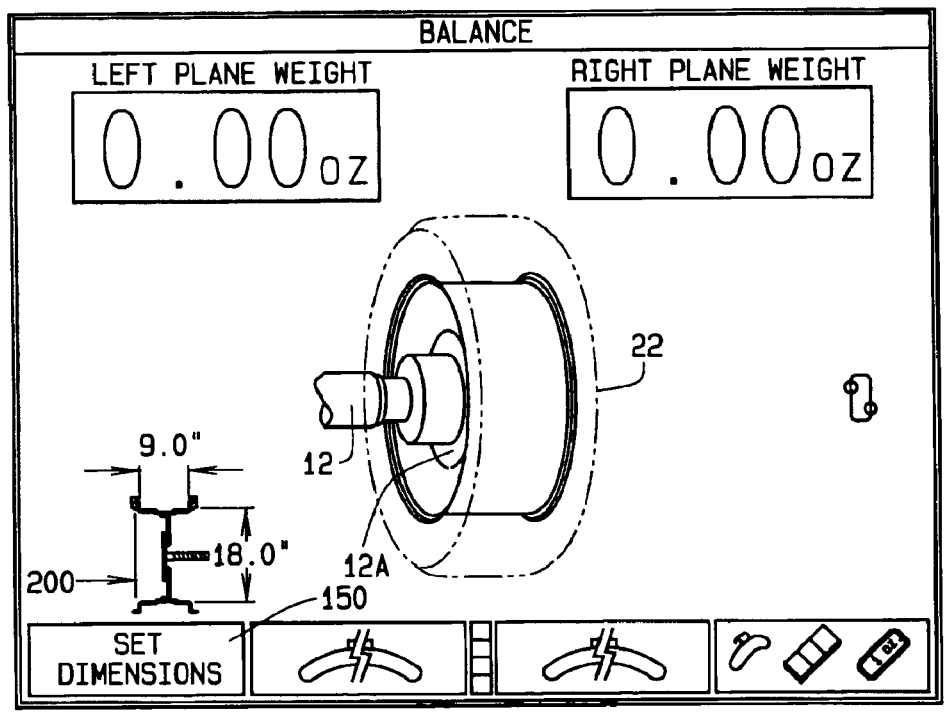
FIG. 8 is a representation of a prior art balancer display similar to FIG. 7, indicating no required weight placements for the rotating body with larger width (weight plane separation) dimensions but having the same imbalance.

A similar problem exists for conventional balancer systems when balancing large wheels. For example, as shown in FIG. 7, a wheel having an 8.0 inch axial width, and a 16.0 inch diameter might have an imbalance above the predetermined weight threshold, resulting in the balancer displaying to an operator that imbalance correction weights are required for both the left or right imbalance correction planes. However, as shown in FIG. 8, if the dimensions of the wheel are manually changed by the operator using button 150 to show an 18.0 inch diameter, without re-measuring the wheel imbalance, less weight is displayed to correct the imbalance, which drops below the predetermined weight threshold level. As a result, a conventional balancer would now indicate to an operator that no weights in the left and right imbalance correction planes are required, despite the fact that the amount of the imbalance is unchanged.

In an alternate embodiment of the present invention, the balancer 10 is provided with a predetermined value representative of the maximum imbalance effect which is permitted for each type of imbalance in the rotating body 22 to be corrected, i.e., for static imbalance and for dynamic imbalance. For example, a predetermined static imbalance moment limit is provided to identify a static imbalance threshold, and a predetermined dynamic imbalance moment limit is provided to identify a dynamic imbalance threshold. Preferably, the predetermined limits are selected to correspond to a level of imbalance moments in the rotating body 22 which are imperceptible to the average consumer, such as 2.18 oz.-in. for a static imbalance moment limit, corresponding to a 0.29 oz. weight on a 15" diameter wheel rim, and 15.0 oz.-in$^2$. for a dynamic imbalance limit which corresponds to approximately a 0.33 oz. weight on a 6" wide, 15" diameter wheel rim. It may be desirable, however, to adjust these limits to favor either static imbalance or dynamic (couple) imbalance. For instance, it is understood that passengers in a vehicle are less sensitive to a dynamic (couple) imbalance than a static imbalance. A way to reduce technician's labor with a minimal increase in vibration would be to increase the dynamic limit to 20.0 oz.-in.$^2$.

Figure 9:
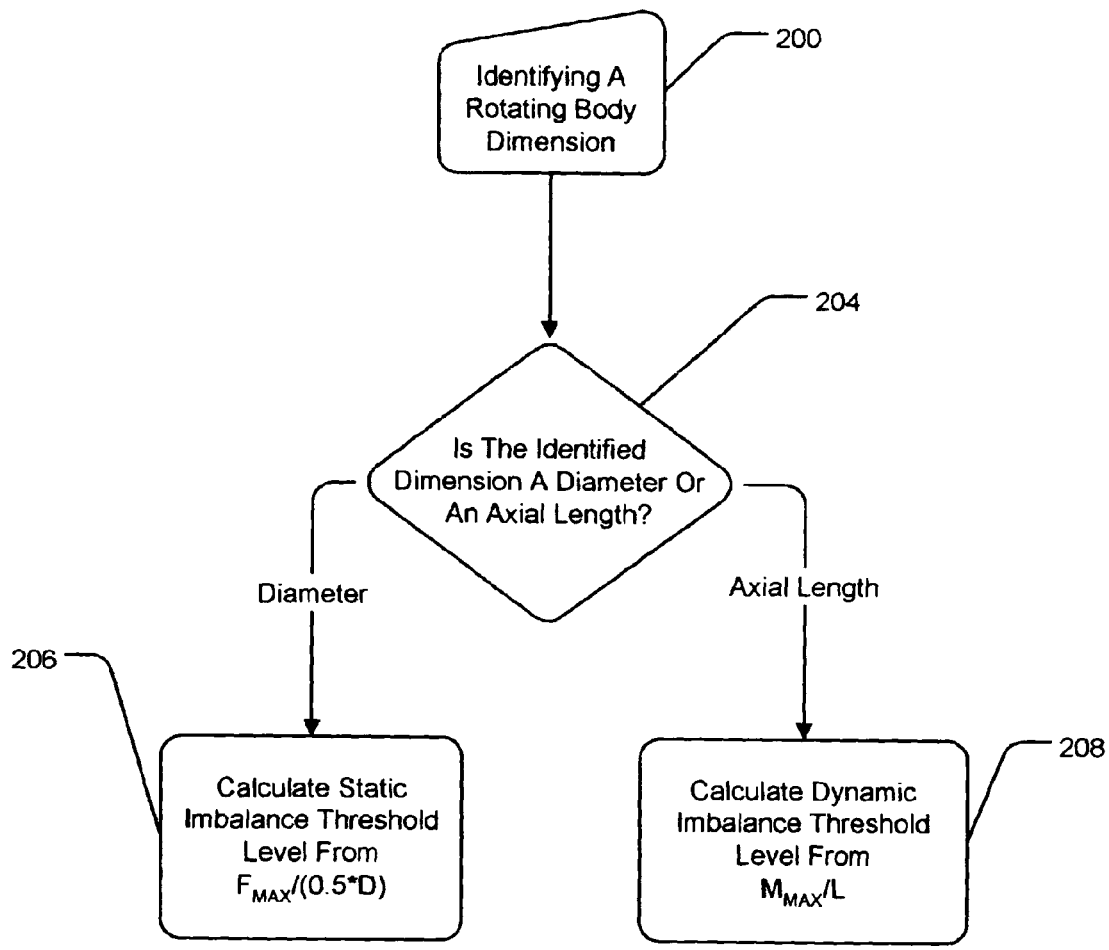
FIG. 9 is a flow chart diagram of a method of the present invention for displaying desired correction weights.

In a second alternate embodiment of the present invention, shown in FIG. 9, a balancer 10 is configured to select an imbalance correction weight display threshold based upon one or more dimensions of the rotating body 22 being balanced. These dimensions include the imbalance correction weight placement diameter and an imbalance correction weight placement separation distance. Preferably, these dimensions are measured directly by the balancer 10 utilizing operator assistance to place a measuring device, such as a dataset arm, at the desired imbalance correction weight planes and/or at the edge of the rotating body 22. Alternatively, when the diameter and width of a rotating body 22 are known, an operator can directly supply the balancer 10 with corresponding values using one or more manual inputs 34 (Box 200).

The balancer 10 is configured to utilize the predetermined value representative of the maximum imbalance effect permitted, together with the associated dimensions of the rotating body 22 to identify a variable imbalance correction threshold used to display, to an operator on display 30, as zero any imbalance which would require an imbalance correction weight value below the variable threshold. (Box 204).

For correcting static imbalances present in the rotating body 22 (Box 206), the predetermined static imbalance moment limit is $F_{max}$ (typically in units of oz.-in.), the known or measured rotating body diameter is D, and the imbalance correction threshold or "blind" is $W_{BS}$. A variable threshold value for $W_{BS}$ is determined by the balancer 10 according to the following equation:

$$W_{BS} = \frac{F_{MAX}}{\left(\frac{D}{2}\right)} \quad \text{Equation (1)}$$

For correcting dynamic imbalances present in the rotating body 22 (Box 208), the predetermined dynamic imbalance moment limit is $M_{max}$, (typically in units of oz.-in.$^2$) the known or measured rotating body axial length or axial width is W, and the imbalance correction threshold or "blind" is $W_{BD}$. If it is assumed that there is no static imbalance in the wheel, a variable threshold value for $W_{BD}$ is determined by the balancer 10 according to the following equation:

$$W_{BD} = \frac{M_{max}}{W*(D/2)} \quad \text{Equation (2)}$$

For example, if the balancer 10 is configured with a predetermined static imbalance moment limit ($F_{max}$) of 2.18 oz.-in. for correcting static imbalances present in the rotating body 22, and the rotating body 22 has a measured or known diameter of 15.0", solving Equation (1) above for $W_{BS}$ yields an imbalance correction threshold or "blind" 0.20 oz. If the rotating body 22 has a measured or known diameter of 12.0", Equation (1) yields an imbalance correction threshold or "blind" of 0.36 oz. Correspondingly, if the rotating body 22 has a measured or known diameter of 20.0", Equation (1) yields an imbalance correction threshold or "blind" of 0.21 oz. for the same value of $F_{max}$.

The benefit offered by a balancer 10 configured to utilize the aforementioned methods to identify imbalance correction thresholds based in-part upon the known or measured dimensions of a rotating body 22 undergoing balancing can be clearly illustrated by the following comparisons.

When balancing a wheel assembly having a 15.0" diameter wheel rim with an axial width of 5.0", it is possible for a conventionally configured balancer to identify a static imbalance over the limit of 2.18 oz.-in. but a dynamic couple under the limit of 15 oz.-in.$^2$ and suggest a correction requiring two imbalance correction weights of 0.25 oz. and 0.75 oz., one to be placed on the inner lip of the wheel rim, and the other to be placed on the outer lip of the wheel rim. However, on a balancer 10 configured with a predetermined dynamic imbalance moment limit ($M_{max}$) of 15.0 oz.in$^2$, the dynamic couple is determined to have minimal effect on the vehicle and will be ignored and the remaining static imbalance can be corrected by a single 0.25 oz. weight.

By setting the imbalance threshold amounts based on the actual force and moment values, rather than displayed weight amounts, it is possible to minimize the residual imbalance in a wheel. A conventional balancer may measure a purely static imbalance that requires 0.50 oz. weight to correct. If the balancer is set to the "Dynamic" balance mode it will calculate that a 0.25 oz. weight is required on both the left and the right planes. Since the traditional threshold is set to 0.29 oz. the machine will show that no correction weights are required, but the wheel is not balanced. With the method of the present invention employed, the correct weights will be displayed and the wheel will be properly balanced. In the example described above, there is a small amount of couple imbalance present along with the static imbalance. Even though the amount of couple is small and no specific weights are required to correct it, it is possible to place the static correction weight in a location to possibly reduce the couple imbalance.

When correcting the static imbalance, the single static weight can be placed on either the inner plane, adjacent the balance, or the outer plane, opposite the balancer. The inner plane is alternatively referred to as the left plane, when the wheel is mounted on the right side of a balancer, and the outer plane is alternatively referred to as the right plane for the same wheel placement. To choose the correct plane in which to place the single static weight, it is necessary to compare the phase of the dynamic couple vector to the phase of the static force vector. The static correction weight is placed on the plane that minimizes the residual dynamic couple imbalance, without the placement of additional couple imbalance correction weights.

This will correct the static imbalance (which was greater than the blind), and depending upon the difference between the couple and static imbalance phase, it will decrease the couple imbalance or leave it unchanged (couple imbalance was already acceptably low). Since the inner and outer plane couple imbalance phases are always 180 degrees apart, the static imbalance phase will never be more than 90 degrees away from one of the couple imbalance phases. If the difference between the static and one of the couple imbalance phases is small, there will be a significant improvement in couple imbalance. If the static imbalance phase is exactly 90 degrees between both couple imbalance phases, the couple imbalance will not change when the static correction weight is added. This can be accomplished by the following logic sequence:

Assume the balancer is in "Dynamic" mode, static imbalance is greater than blind, and couple imbalance is less than the predetermined blind. The following steps are taken to place a single weight that will correct the static imbalance while reducing (or not changing) the couple imbalance.

Let couple imbalance=0 and calculate the static correction weight.

Static weight magnitude=Static imbalance/radius

Static weight phase=Static imbalance phase+180 degrees.

To correct the static imbalance, this weight could be placed on either the inner plane or the outer plane.

If the difference between the static imbalance phase angle and the outer plane couple imbalance phase angle is less than 90 degrees, place the single static correction weight on the outer plane. Otherwise, place the weight on the inner plane.

If the balancer is in "Static" mode it is common that dimensions will only be entered for a single plane. With the present invention it is desirable to compare the absolute dynamic couple imbalance to the dynamic couple threshold. If the absolute dynamic couple exceeds the threshold it is desirable to provide an indicator to the operator of this condition. The indication may be in the form of blinking lights, alpha-numeric text, or in the form of a message. If the operator has entered dimensions for two planes the indicator may be in the form of a display of the weights required to correct the couple imbalance.

To aid an operator in determining if a rotating body 22 has been balanced to within a predetermined threshold for both static imbalance and dynamic imbalance, the balancer 10 in an alternate embodiment is configured to provide the operator with a graphical illustration 300 of the measured imbalances relative to the threshold level of absolute imbalances on display 30, i.e. the couple imbalance threshold and the static imbalance threshold. Conventionally, such as shown in U.S. Pat. No. 5,915,274 to Douglas, weights required to correct static and dynamic imbalances are displayed relative to a fixed weight amount threshold to an operator on a bar graph. The fixed weight amount is based on the incremental weight size and the vehicle wheel geometry. In contrast, the graphical illustration 300 of the present invention displays information to an operator based upon absolute imbalances, and not on the incremental weight sizes and vehicle wheel geometry.

Figure 12:
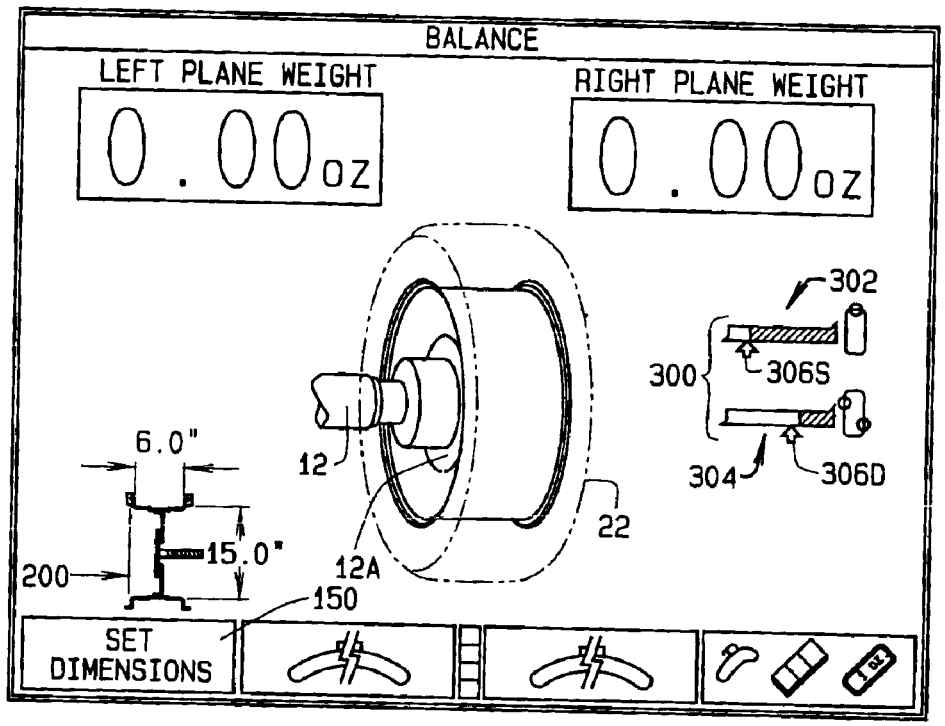
FIG. 12 is a representation of a display of the present invention showing a graphical presentation of the imbalance forces in the rotating body.
Figure 13:
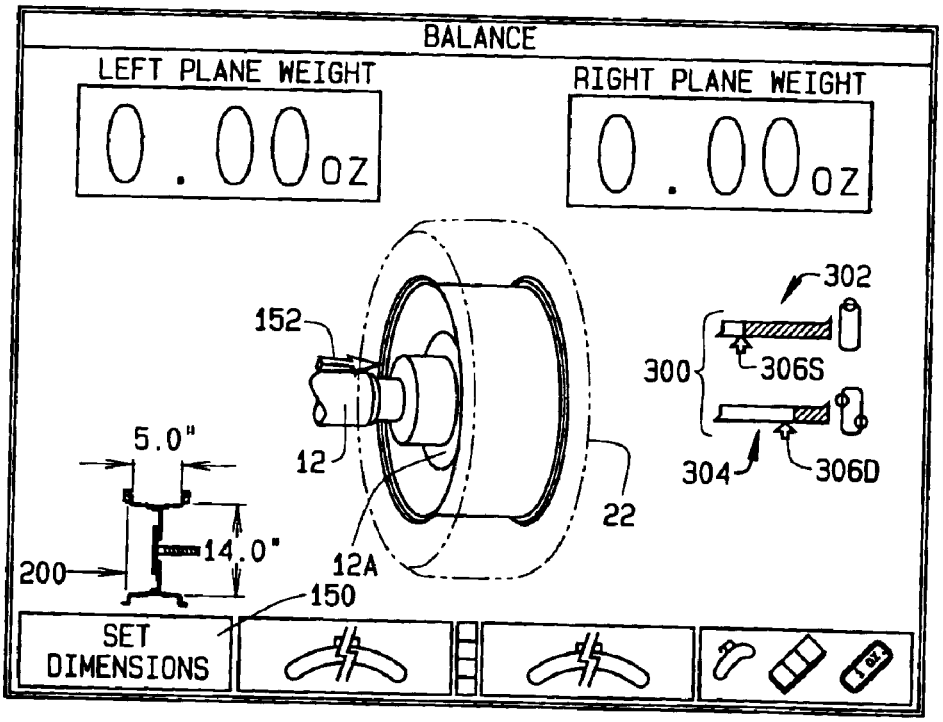
FIG. 13 is a representation of a display similar to FIG. 12, indicating that no additional weight is required on the wheel with a smaller diameter dimension and having the same imbalance.

Turning to FIGS. 12 and 13, a display 30 from a balancer 10 configured with the features of the present invention is shown first for a wheel having an axial length or width of 6.0 inches and a diameter of 15.0 inches. In this example, the imbalance present in the wheel for both static and dynamic imbalance is below a threshold level. This is illustrated with the graphical illustration 300, incorporating a sliding scale 302 for static imbalance, and a sliding scale 304 for dynamic imbalance. On each sliding scale 302 and 304, shown in FIG. 12, the computed imbalance amounts, as indicated by the arrows 306S and 306D, fall within the acceptable range, hence no imbalance correction weight amounts are indicated for the left and right correction planes. Further, as shown in FIG. 13, if the dimensions of the wheel are manually changed by the operator to indicate a 5.0 inch axial with and a 14.0 inch diameter, (corresponding to the change shown in FIG. 6) without re-measuring the imbalance, the measured imbalance in the wheel remains unchanged, as shown on the sliding scales 302 and 304. As a result, no imbalance correction weight amounts are indicated for the left and right correction planes.

Figure 14:
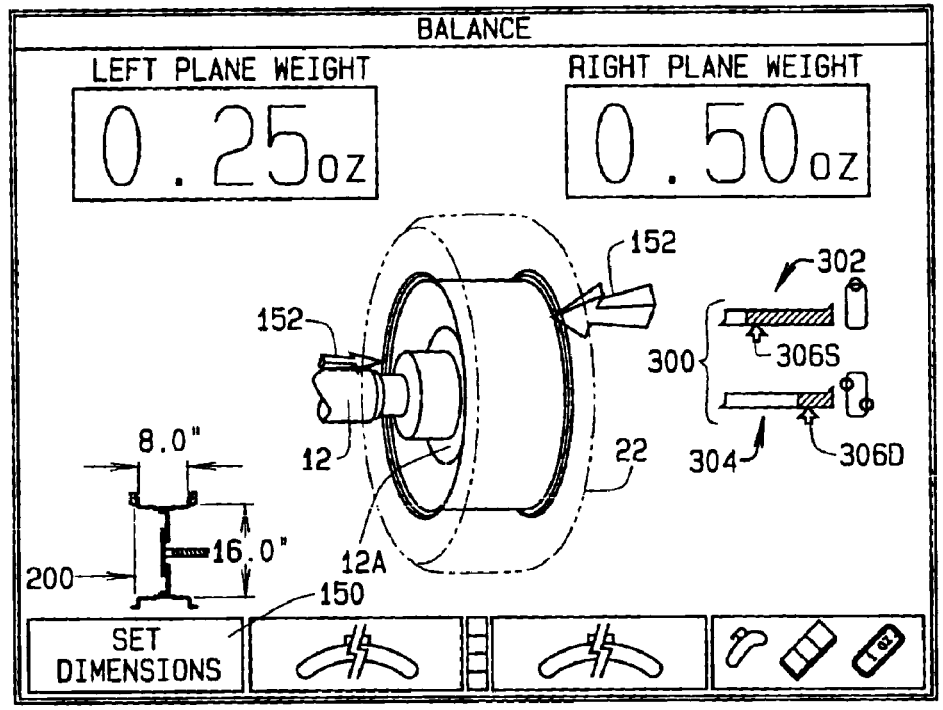
FIG. 14 is a representation of a display of the present invention showing a graphical presentation of the imbalance forces in the rotating body.
Figure 15:
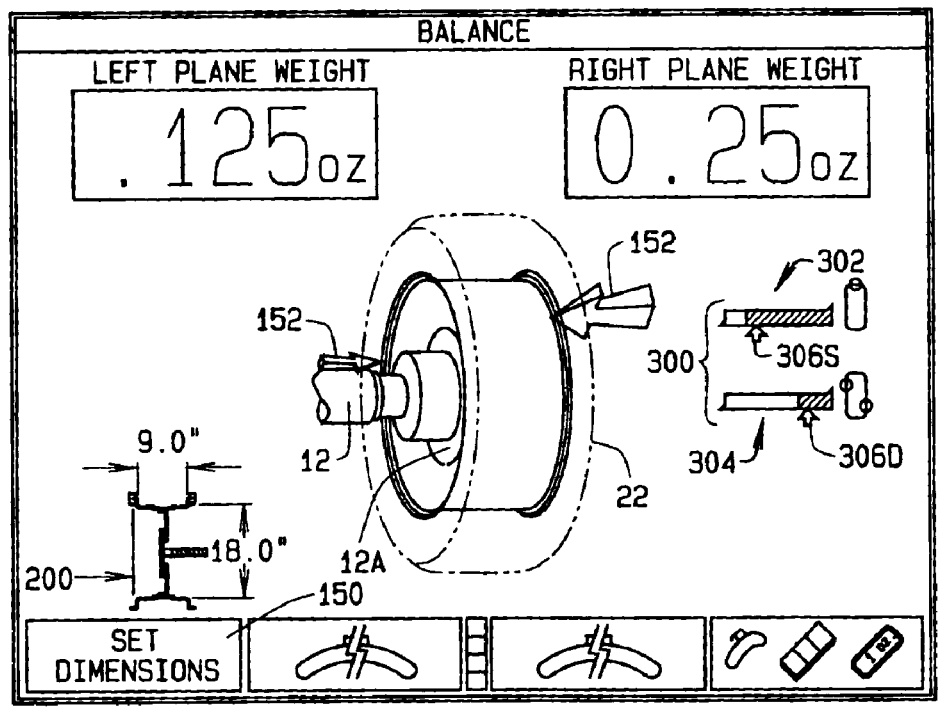
FIG. 15 is a representation of a display similar to FIG. 12, indicating that less weight is required on a wheel with larger width (weight plane separation) dimensions but having the same imbalance.

The method of the present invention provides a similar advantage when balancing large wheels. For example, as. shown in FIG. 14, a wheel having a 8.0 inch axial width, and a 16.0 inch diameter might have an imbalance above the threshold, as shown on sliding scales 302 and 304, resulting in the balancer displaying to an operator imbalance correction weights required for both the left and right imbalance correction planes. However, as shown in FIG. 15, if the dimensions of the wheel are manually changed by the operator to show an 18.0 inch diameter, without re-measuring the imbalance, less weight is required to correct the same imbalance. As a result, the balancer indicates to an operator that reduced weights in the left and right imbalance correction planes are still required to correct the imbalance which is above the imbalance threshold.

It is known that a rotating body 22 static imbalance force is a function of the imbalance mass, the radial distance of the imbalance mass from the axis of rotation, and the angular velocity of the rotating body 22. In a vehicle wheel application, where the rotating body 22 consists of a wheel rim and tire assembly, for any given vehicle speed, the angular velocity may be expressed as a function of the tire diameter or as a function of the tire diameter and the wheel rim diameter. Hence, in an alternate embodiment of the present invention, the imbalance force F, experienced by a vehicle from a rotating wheel assembly may be defined as:

$$F = \frac{\left(\frac{v}{\pi D_T}\right)^2 m D_W}{2} \quad \text{Equation (3)}$$

where v is the vehicle velocity, $D_T$ is the tire diameter, $D_W$ is the correction weight application diameter, which is equal to the wheel diameter for clip-on weights, and m is the imbalance mass. For example, if an acceptable imbalance correction threshold or "blind" for a wheel rim having a diameter $D_{W0}$ of 15.0" with a tire having a diameter $D_{T0}$ of 28.0" is 0.29 oz. ($m_0$), an equation for calculating an equivalent "blind" ($m_1$) for an assembly with the dimensions $D_{W1}$ and $D_{T1}$ is:

$$m_1 = \frac{m_0 D_{W0}}{D_{W1}} \left(\frac{D_{T1}}{D_{T0}}\right)^2 \quad \text{Equation (4)}$$

Figure 10A:
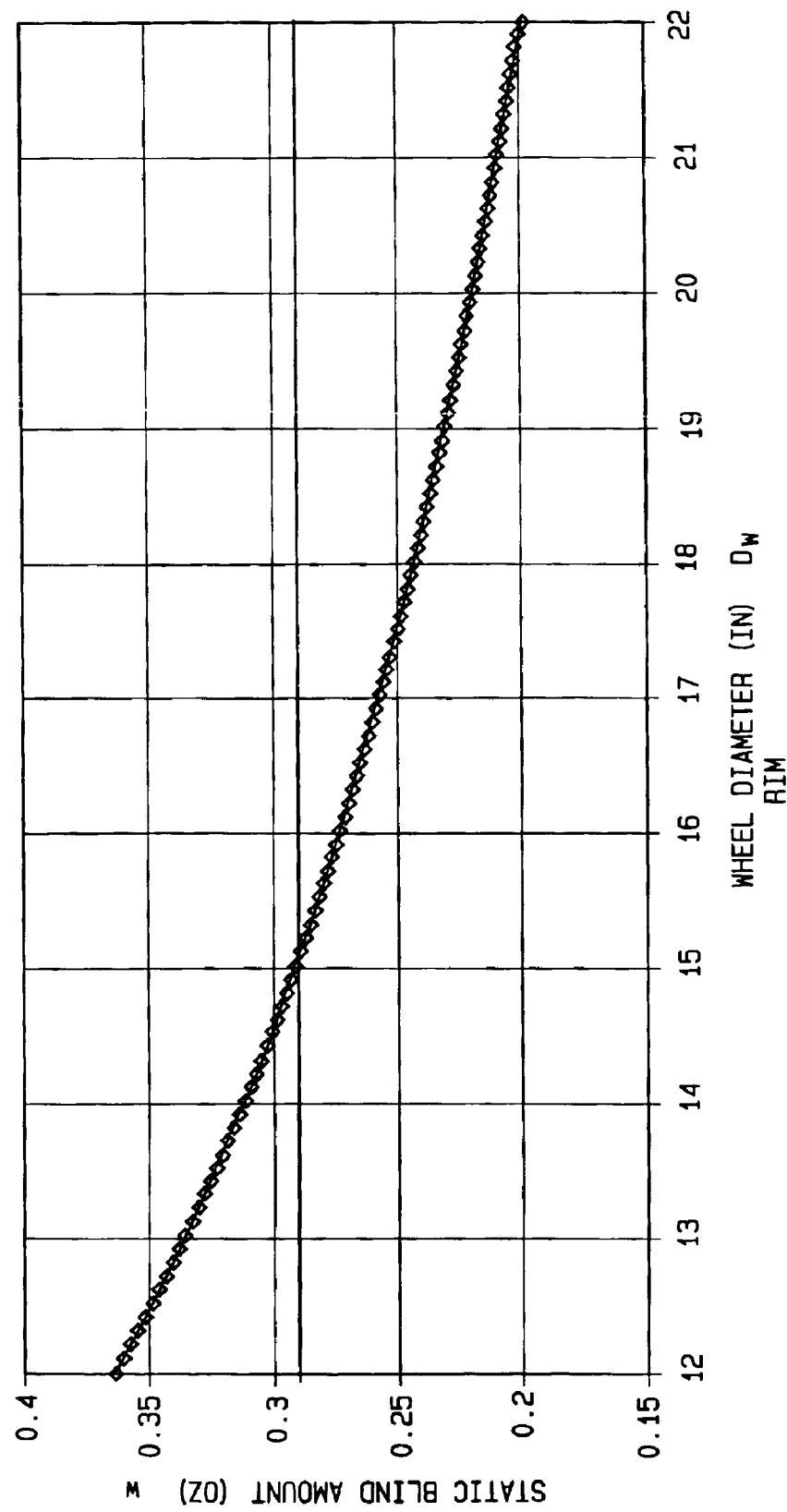
FIG. 10A is a two dimensional graphical representation of the blind amount versus wheel diameter for a predetermined static imbalance limit.
Figure 10B:
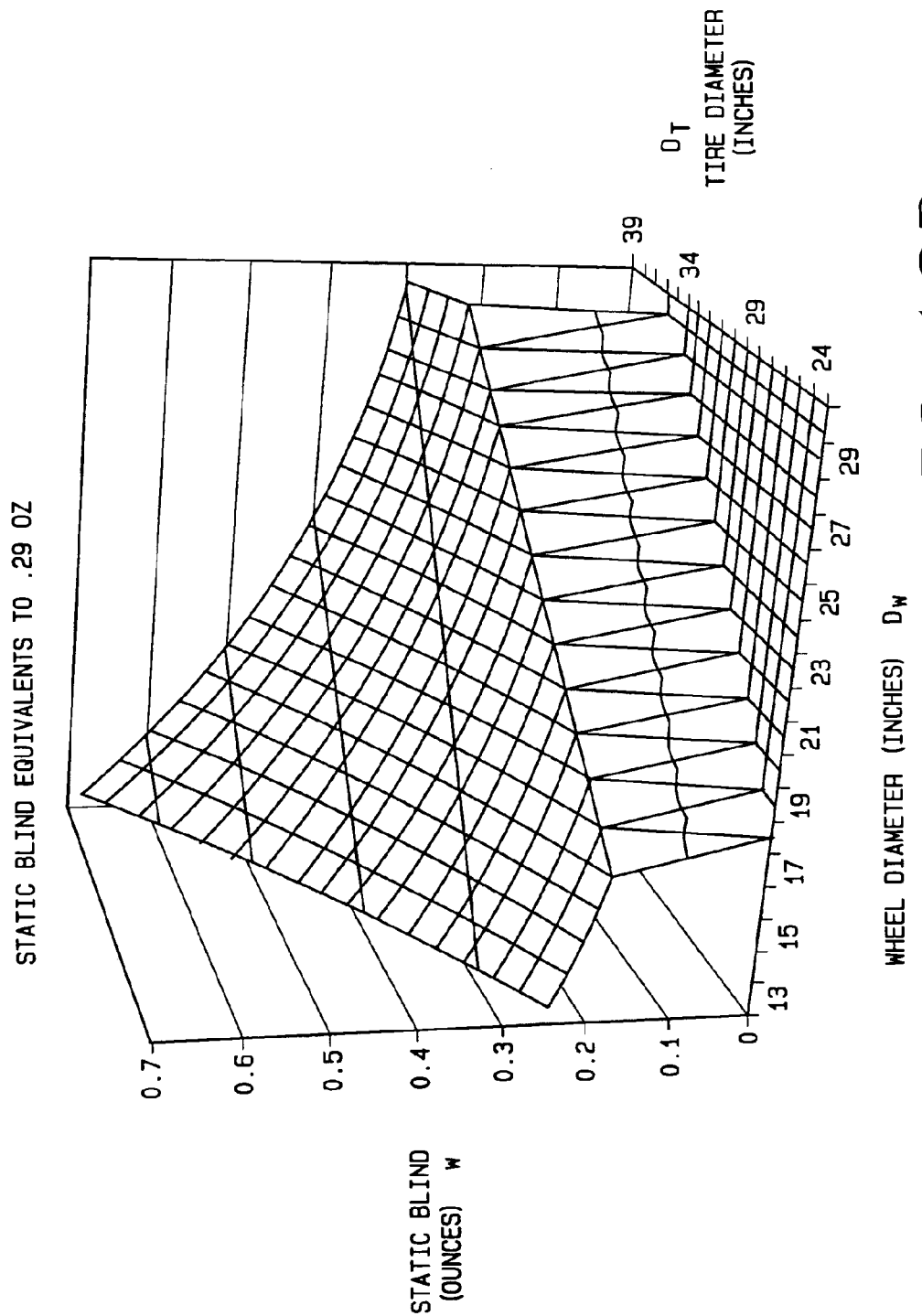
FIG. 10B is a surface plot representation of the blind amount compared with wheel diameter and tire diameter for a predetermined static imbalance limit.

Once an acceptable imbalance correction threshold or "blind" is established for a particular tire and rim combination, an equivalent imbalance correction threshold or "blind" may be automatically calculated using Equation (4) for a wide variety of wheel assemblies, providing an imbalance correction threshold curve, such as shown in FIGS. 10A for wheel rim dimensions and in FIG. 10B for tire dimensions.

Utilizing the tire diameter $D_T$, and the wheel diameter $D_W$, wheel assemblies may be classified into predefined groupings. For example, performance wheel assemblies where $D_T$-$D_W$ is relatively small (~3.0 inches or less), touring wheel assemblies, where $D_T$-$D_W$ is between 3.0" and 5.0", and truck wheel assemblies, where $D_T$-$D_W$ is greater than 5.0". Each different predefined grouping may be provided with a different acceptable imbalance correction threshold or "blind" curve. Using Equation (4), the specific imbalance correction threshold or "blind" for a wheel assembly having specific dimensions may be automatically calculated, once a specific tire grouping and associated curve has been selected.

A similar analysis for the rotating body 22 couple imbalance force can be made. Where L is the wheel width, the imbalance couple (M) felt by the vehicle can be expressed as:

$$M = \left(\frac{v}{\pi D_T}\right)^2 wL \frac{D_W}{2} \quad \text{Equation 5}$$

If an an acceptable imbalance correction threshold or "blind" for a wheel assembly having a 15×6 inch wheel rim ($D_{W0}$×$L_0$), with a 28.0 inch diameter tire ($D_{T0}$) installed thereon is 0.29 oz ($w_0$) then using Equation 5, and equivalent blind ($w_1$) for an assembly with the dimension $D_{W1}$, $D_{T1}$, and $L_1$ is:

$$w_1 = \frac{w_0 D_{W0}}{D_{W1}} \left(\frac{D_{T1}}{D_{T0}}\right)^2 \frac{L_0}{L_1} \quad \text{Equation 6}$$

Figure 11A:
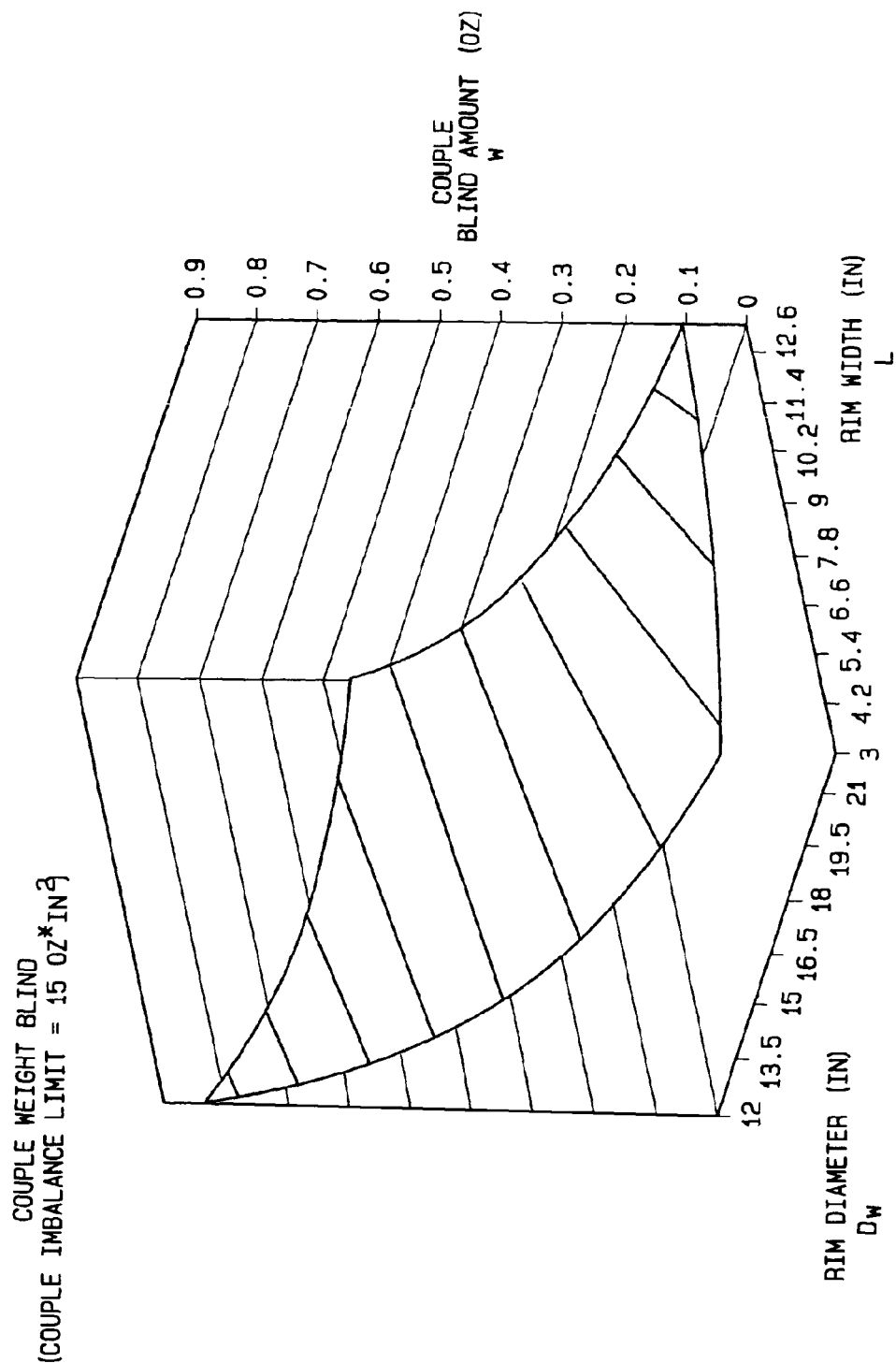
FIG. 11A is a surface plot representation of wheel rim diameter, wheel width, and couple blind amount for a predetermined couple imbalance limit.
Figure 11B:
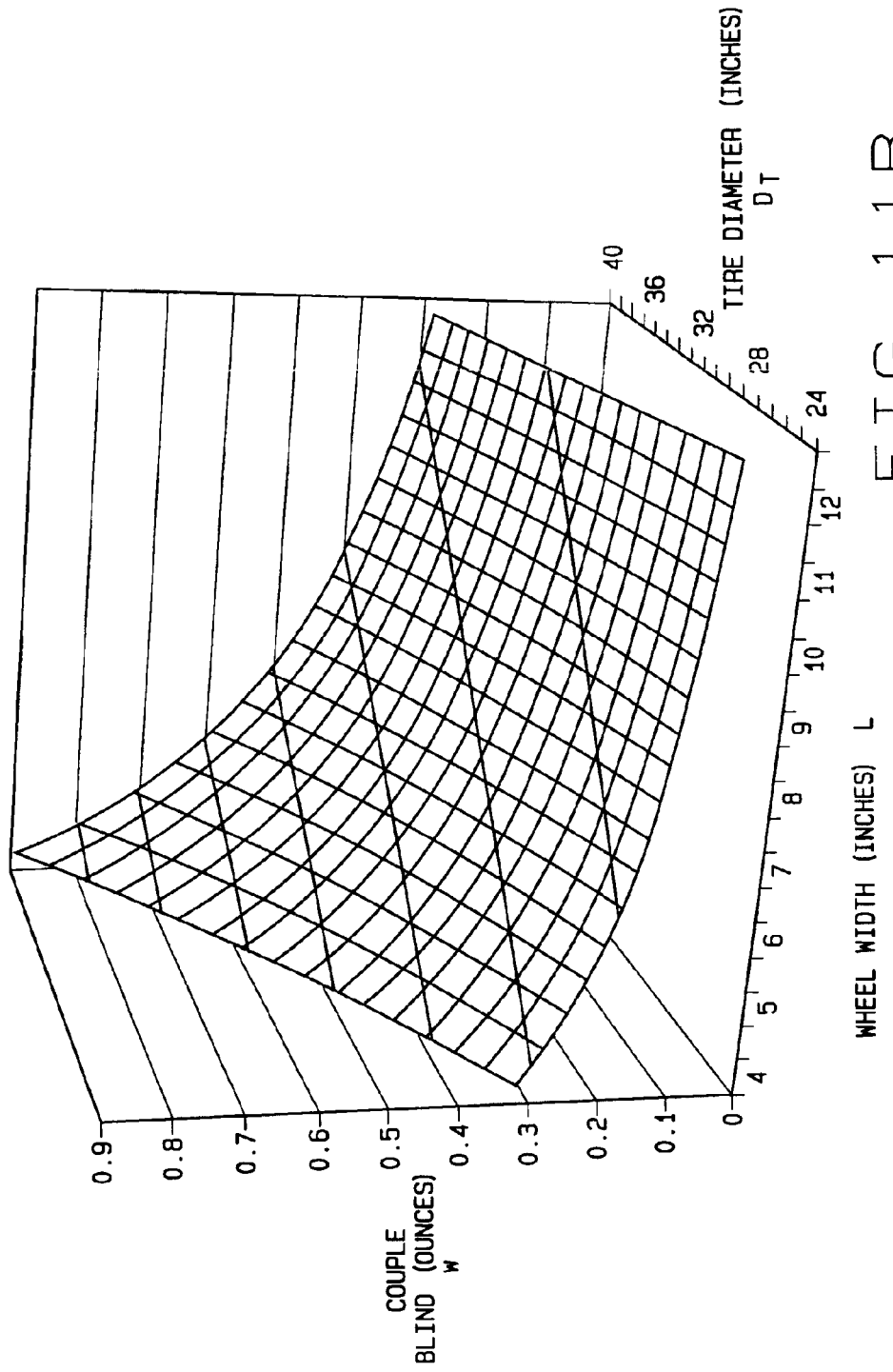
FIG. 11B is a surface plot similar to FIG. 11A, for tire diameter, wheel width, and couple blind amount for a predetermined couple imbalance limit.

Once an acceptable couple imbalance correction threshold or "blind" is established for a particular tire and rim combination, an equivalent couple imbalance correction threshold or "blind" may be automatically calculated using Equation (6) for a wide variety of wheel assemblies, providing an couple imbalance correction threshold curve, such as shown in FIGS. 11A for wheel rim dimensions and FIG. 11B for tire dimensions.

The present invention can be embodied in-part in the form of computer-implemented processes and apparatuses for practicing those processes. The present invention can also be embodied in-part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A method for establishing an imbalance correction weight threshold level in a balancer system configured to measure one or more imbalance parameters of a rotating body, comprising the steps of:
    identifying at least one dimension of the rotating body;
    selecting an imbalance limit associated with each of said one or more imbalance parameters;
    calculating an imbalance correction weight threshold level for each of said one or more imbalance parameters utilizing said identified at least one dimension and said selected associated imbalance limit.

2. The method of claim 1 wherein the step of identifying at least one dimension includes identifying a diameter of the rotating body; and wherein the step of calculating includes utilizing said identified diameter and a selected imbalance limit associated with a static imbalance of said rotating body.

3. A method for establishing an imbalance correction weight threshold level in a balancer system configured to measure one or more imbalance parameters of a rotating body, comprising the steps of:
    identifying a diameter of the rotating body;
    selecting an imbalance limit associated with a static imbalance parameter of the rotating body;
    calculating an imbalance correction weight threshold level for said static imbalance parameter utilizing said identified diameter and said selected imbalance limit;
    wherein the step of calculating includes solving the equation $$W_{BS} = \frac{F_{MAX}}{\left(\frac{D}{2}\right)}$$

where
    $W_{BS}$ is the imbalance correction weight threshold level,
    $F_{MAX}$ is said selected imbalance limit associated with said static imbalance of the rotating body, and
    D is a diameter of a correction weight circle of the rotating body.

4. The method of claim 1 wherein the step of identifying at least one dimension includes identifying a diameter and an axial width for placing correction weights on the rotating body; and wherein the step of calculating includes utilizing said identified diameter, said identified axial width, and a selected imbalance limit associated with a dynamic imbalance of said rotating body.

5. A method for establishing an imbalance correction weight threshold level in a balancer system configured to measure one or more imbalance parameters of a rotating body, comprising the steps of:
    identifying a diameter of the rotating body and an axial width for placing correction weights on the rotating body;
    selecting an imbalance limit associated with a dynamic imbalance parameter of the rotating body;
    calculating an imbalance correction weight threshold level for said dynamic imbalance parameter utilizing said identified diameter, said identified axial width, and said selected associated imbalance limit;
    wherein the step of calculating includes solving the equation $$W_{BD} = M_{MAX}/(W \times D/2)$$

where
    $W_{BD}$ is the correction weight threshold level for said dynamic imbalance parameter,
    $M_{max}$ is said selected associated imbalance limit,
    W is said axial width between the weight placement planes of the rotating body, and
    D is a diameter of the weight placement planes of the rotating body.

6. A method for establishing imbalance correction weight threshold levels in a balancer system configured to measure a static imbalance parameter and a dynamic imbalance parameter of a rotating body, comprising the steps of:
    identifying a diameter of the rotating body;
    identifying an axial width of the rotating body;
    selecting an imbalance limit associated with said static imbalance parameter,
    selecting an imbalance limit associated with said dynamic imbalance parameter;
    calculating an imbalance correction weight threshold level for said static imbalance parameter utilizing said identified diameter and said selected imbalance limit associated with said static imbalance parameter;
    calculating an imbalance correction weight threshold level for said dynamic imbalance parameter utilizing said identified diameter, said identified axial width, and a selected imbalance limit associated with said dynamic imbalance parameter.

7. A method for balancing a vehicle wheel utilizing an imbalance correction weight threshold level for a static imbalance parameter calculated utilizing an identified wheel diameter and a selected imbalance limit associated with the static imbalance parameter, and an imbalance correction weight threshold level for a dynamic imbalance parameter calculated utilizing the identified wheel diameter, an identified wheel axial width, and a selected imbalance limit associated with the dynamic imbalance parameter comprising the steps of:
    obtaining a measurement of static and dynamic imbalance in the vehicle wheel;
    determining static and dynamic imbalance correction weights for the vehicle wheel based upon said obtained measurements of static and dynamic imbalance;

selecting, responsive to said determined static imbalance correction weight exceeding the calculated imbalance correction weight threshold level for said static imbalance and to said determined dynamic imbalance correction weight being less than the calculated imbalance correction weight threshold level for said dynamic imbalance, a placement position for said static imbalance correction weight which reduces said measurement of dynamic imbalance in the vehicle wheel.

8. The method of claim 7 for balancing a vehicle wheel wherein the step of selecting a placement position for said static imbalance correction weight includes:

calculating a static imbalance correction weight placement phase angle;

calculating an inner wheel plane dynamic imbalance correction weight placement phase angle;

calculating an outer wheel plane dynamic imbalance correction weight placement phase angle;

identifying one of said inner and outer wheel plane dynamic imbalance correction weight placement phase angles which is nearest to said static imbalance correction weight placement phase angle;.and placing said static imbalance correction weight at said calculated static imbalance correction weight placement phase angle in a wheel plane corresponding to the wheel plane of said nearest identified dynamic imbalance correction weight placement phase angle.

9. A method for establishing a static imbalance correction weight threshold level for a grouping of vehicle wheel assemblies having similar characteristics in a vehicle wheel balancer system configured to measure one or more imbalance parameters of a vehicle wheel assembly, comprising the steps of:

establishing an acceptable static imbalance correction weight threshold for a vehicle wheel assembly in the grouping of vehicle wheel assemblies, said vehicle wheel assembly having a known wheel rim diameter and a known tire diameter;

identifying a vehicle wheel rim diameter and a tire diameter for a vehicle wheel assembly in the grouping of vehicle wheel assemblies having an unknown imbalance;

calculating a static imbalance correction weight threshold level said vehicle wheel assembly having an unknown imbalance utilizing the equation $$m_1 = \frac{m_0 D_{w0}}{D_{w1}} \left(\frac{D_{T1}}{D_{T0}}\right)^2$$

where $m_1$ is the calculated static imbalance correction weight threshold level;

$m_0$ is the established acceptable static imbalance correction weight threshold level;

$D_{w0}$ is the known wheel rim diameter;

$D_{T0}$ is the known tire diameter;

$D_{w1}$ is the identified wheel rim diameter for said vehicle wheel assembly having an unknown imbalance; and $D_{T1}$ is the identified tire diameter for said vehicle wheel assembly having an unknown imbalance.

10. A method for selecting an imbalance correction weight threshold level for a vehicle wheel assembly having an unknown imbalance in a vehicle wheel balancer system configured to measure one or more imbalance parameters of a vehicle wheel assembly, comprising the steps of:

identifying a grouping of vehicle wheel assemblies having similar characteristics to the vehicle wheel assembly having the unknown imbalance;

identifying an associated acceptable imbalance correction weight threshold curve for said identified grouping of vehicle wheel assemblies; and determining a specific imbalance correction weight threshold for the vehicle wheel assembly having the unknown imbalance from said identified acceptable imbalance correction weight threshold curve and one or more characteristics of the vehicle wheel assembly having the unknown imbalance.

11. The method for selecting an imbalance correction weight threshold level of claim 10 wherein said specific imbalance correction weight threshold is a static imbalance correction weight threshold.

12. The method for selecting an imbalance correction weight threshold level of claim 10 wherein said specific imbalance correction weight threshold is a couple imbalance correction weight threshold.

13. A method for establishing a couple imbalance correction weight threshold level for a grouping of vehicle wheel assemblies having similar characteristics in a vehicle wheel balancer system configured to measure one or more imbalance parameters of a vehicle wheel assembly, comprising the steps of:

establishing an acceptable couple imbalance correction weight threshold for a vehicle wheel assembly in the grouping of vehicle wheel assemblies, said vehicle wheel assembly having a known wheel rim diameter, wheel rim width, and a known tire diameter;

identifying a vehicle wheel rim diameter, a wheel rim width, and a tire diameter for a vehicle wheel assembly in the grouping of vehicle wheel assemblies having an unknown imbalance;

calculating a couple imbalance correction weight threshold level said vehicle wheel assembly having an unknown imbalance utilizing the equation $$w_1 = \frac{w_0 D_{w0}}{D_{w1}} \left(\frac{D_{T1}}{D_{T0}}\right)^2 \frac{L_0}{L_1}$$

where $w_1$ is the calculated couple imbalance correction weight threshold level;

$w_0$ is the established acceptable couple imbalance correction weight threshold level;

$D_{w0}$ is the known wheel rim diameter;

$D_{T0}$ is the known tire diameter;

$D_{w1}$ is the identified wheel rim diameter for said vehicle wheel assembly having an unknown imbalance;

$D_{T1}$ is the identified tire diameter for said vehicle wheel assembly having an unknown imbalance;

$L_0$ is the known wheel rim width; and $L_1$ is the identified wheel rim width for said vehicle wheel assembly having an unknown imbalance.

* * * * *

UNITED STATES PATENT AND TRADEMARK OFFICE
CERTIFICATE OF CORRECTION

PATENT NO. : 6,952,964 B2
APPLICATION NO. : 10/648165
DATED : October 11, 2005
INVENTOR(S) : Michael D. Gerdes et al.

Page 1 of 1

It is certified that error appears in the above-identified patent and that said Letters Patent is hereby corrected as shown below:

Col. 9, Line 29
 Replace "0.20"
 with --0.29--

Col. 15, Line 23
 Delete the "." after the angle;

Signed and Sealed this

Twenty-sixth Day of February, 2008

JON W. DUDAS
*Director of the United States Patent and Trademark Office*